Nov. 11, 1930.  B. M. RUSSELL  1,781,034
AUTOMOBILE SEAT COVER
Filed June 18, 1928
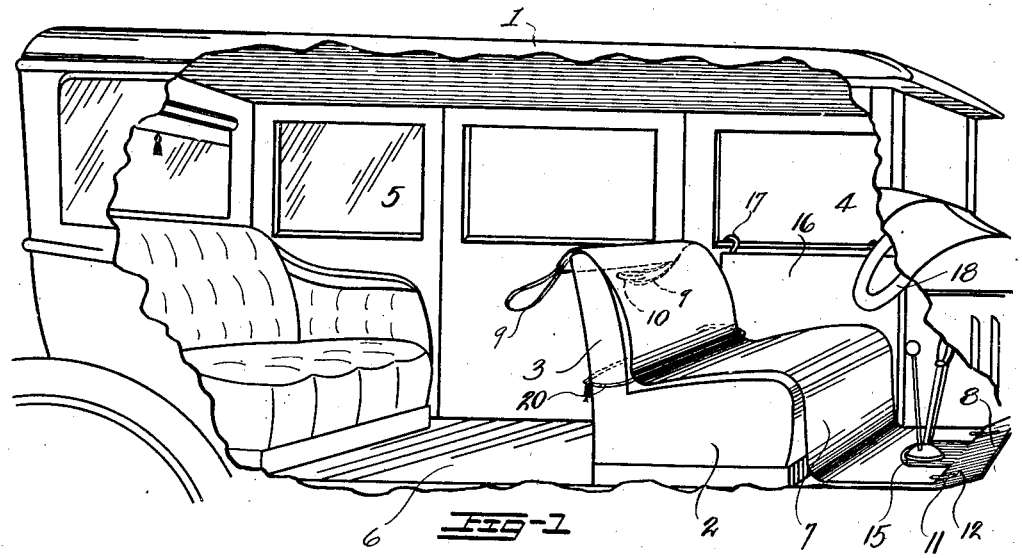
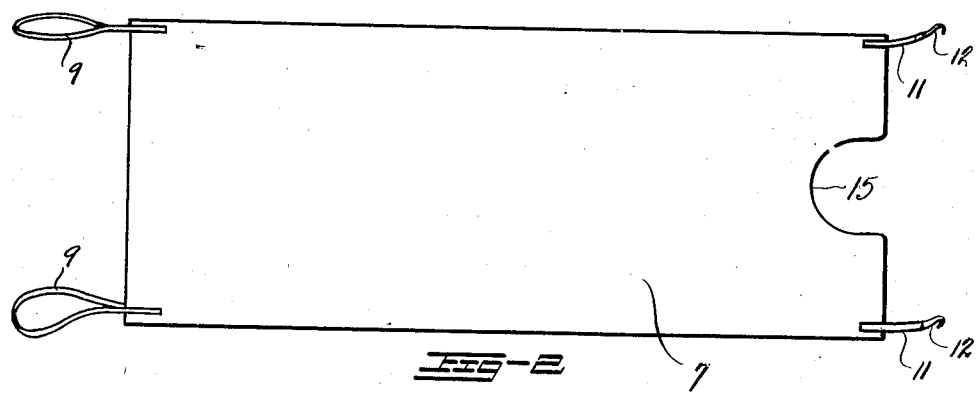
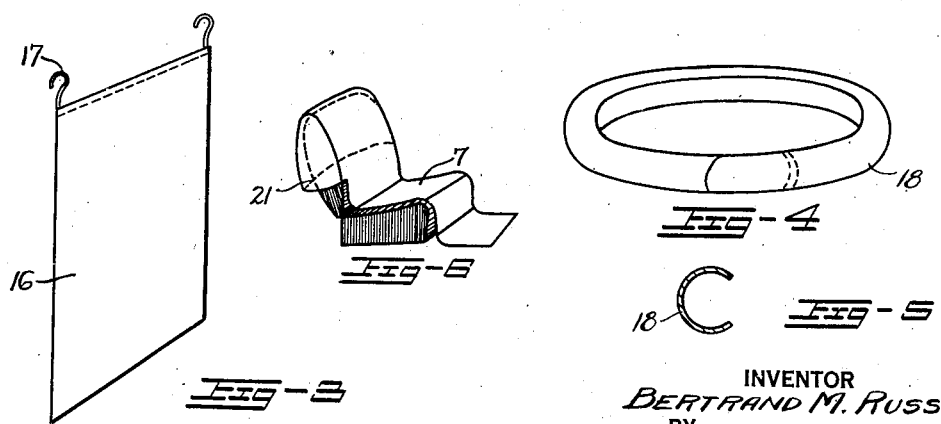
INVENTOR
BERTRAND M. RUSSELL
BY
Cook & Robinson
ATTORNEY Patented Nov. 11, 1930

1,781,034

UNITED STATES PATENT OFFICE

BERTRAND M. RUSSELL, OF SEATTLE, WASHINGTON

AUTOMOBILE SEAT COVER

Application filed June 18, 1928. Serial No. 286,240.

This invention relates to improvements in automobile seat covers and more particularly to covers which are intended to be used only temporarily as a means of protecting a seat against being soiled while the car is being overhauled or repaired.

It is customary, when an automobile is driven into a shop or garage, for a mechanic to get in and try out the engine. Sometimes a sheet of cloth or a canvas is first spread over the seat as a precaution against its being soiled by the workman's clothes, but usually this canvas is placed in a rather careless and haphazard manner without any regard as to whether or not its clean side is next to the seat. As a result, the seat becomes soiled. Even when care is exercised in placing the canvas over the seat, there is a likelihood that when this same canvas is used with the next car it will be turned over without regard to spots or grease.

In view of the various difficulties resulting from seat cushions of automobiles being soiled by workmen, it has been the principal object of the present invention to provide seat covers of paper, or of a similar, relatively inexpensive material, which will readily conform to the cushions or seats to which they are applied and which are equipped with supporting means whereby they may be held in place while in use; such supporting means being in the nature of loops for application to the door handles, or the like, and hooks that are applicable to the rug or floor mat.

It is also an object of the invention to provide in connection with the seat cover, means for protecting the side doors or walls of the car and for protecting the steering wheel from grease on the mechanic's hands.

In accomplishing these and other objects of the invention, I have provided the improved details of construction, the preferred forms of which are illustrated in the accompanying drawings, wherein—

Figure 1 is a perspective view of an automobile body with a side wall broken away and showing a seat cover embodied by the present invention, as applied in use.

Figure 2 is a perspective view of the seat cover.

Figure 3 is a view of one of the side wall protecting pieces.

Figure 4 is a perspective view of the steering wheel cover.

Figure 5 is a cross sectional view of the same.

Figure 6 is a perspective view of a cover of an alternative form of construction.

Referring more in detail to the drawings—

1 designates what may be an automobile of an ordinary sedan type of construction, having a front seat 2 and back cushion 3, front door 4, rear door 5 and the usual floor 6. The seat cover embodied by this invention consists of a single sheet of paper 7, of a durable quality, of approximately the width of the seat and of such length that it may be placed over the seat and back with its rear end extended somewhat beyond the back and its forward end extended along the floor forwardly of the seat over the front mat, designated at 8. Fixed to the rear end of the strip of paper, preferably at the corners, are tapes forming loops 9 that are adapted to be hooked over the handles 10 or the winding cranks of the rear doors to hold the strip in place over the seat. At the forward end of the strip, at its corners, are tabs 11 provided with small hooks 12, or fasteners of any other suitable kind, adapted to be hooked into or engaged with the floor mat 8 as a means of holding this end of the cover in place. The forward end of the strip is provided with a cut-out portion 15 adapted to receive or fit around the gear shift and brake levers and to permit the strip to extend substantially up under the instrument board.

Where covers of this character are used in automobiles having the individual bucket type seats, such as in coaches, the cover strips may be provided at their upper ends with pockets 21, as shown in Figure 6, adapted to be fitted down over the seat back. This not only serves to completely cover the back, but also serves to hold the strip in place.

As a means of protecting the side walls of the doors against being soiled, I have provided paper, or cardboard, panels 16 of suitable size, and have attached wire hooks 17 to their upper edges which are adapted to hook over the window sill, as shown in Figure 1, as a means of supporting the panel in place. Panels of this character made of cardboard and lined on the under side, with the hooks securely attached thereto, may be used for an indefinite time.

As a protection for the steering wheel, I have provided paper covers 18 of annular form which may be fitted over the wheel and secured thereto in any suitable manner. The paper for this purpose would be crimped so that it will readily conform to the wheel.

It is readily apparent that paper strips of this character made of paper of a substantial quality could be provided at a very small expense and that, after once being used, they could be destroyed. It is also apparent that various means other than here shown could be provided for supporting the strip while in use, such as by the attaching of hooks to the rear end of the strip for application over the robe rail.

Another use to which covers of this type are very well adapted is for covering seats of new cars while in transit. When the covers are used for this particular purpose additional means is provided for holding them in place over the seat, such as by extending a cord about the strip and back of the seat, as designated at 20 in Figure 1.

It is further apparent that covers of this character can be made in various shapes and that, in some instances, it may be practicable to provide the seat cover with portions adapted to overlap the side walls in lieu of the cardboard pieces.

Having thus described my invention, what I claim as new therein and desire to secure by Letters Patent, is:

1. A seat cover of the character described comprising a strip of paper, or the like, adapted to be extended over a seat and forwardly thereof along the floor of an automobile, and loops at one end of the strip adapted for application to fittings of the vehicle rearwardly of the seat to hold that end of the strip in place and means at the other end of the strip for holding engagement with the floor mat.

2. The combination with an automobile, of a protective cover for the seat and floor and comprising a single protective strip adapted to be placed over the seat, to conform thereto and to extend forwardly of the seat along the floor; said strip having tapes forming loops at its rear end corners adapted to be applied over door handles or the like to support the strip in place, and having tapes extended from its forward end with hooks thereon for holding contact with a floor mat; said strip of paper having a recess in its forward end portion for fitting about the gear shift and brake levers.

Signed at Seattle, Washington, this 4th day of June, 1928.

BERTRAND M. RUSSELL.